Feb. 1, 1955 C. M. KRETCHMER 2,700,943
METHOD AND APPARATUS FOR MAKING CANDY BAR STRIPS
Filed Sept. 25, 1952 2 Sheets-Sheet 1
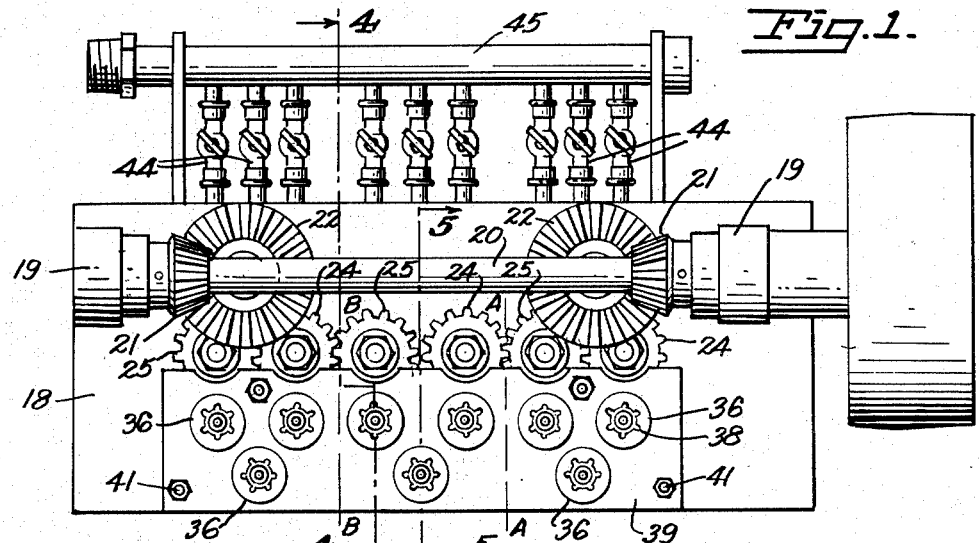
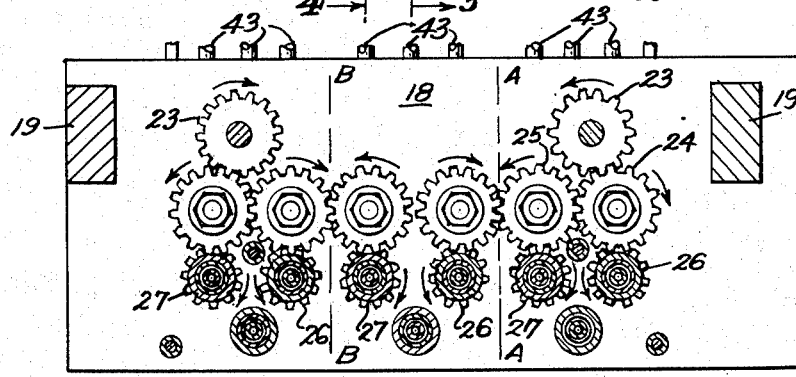
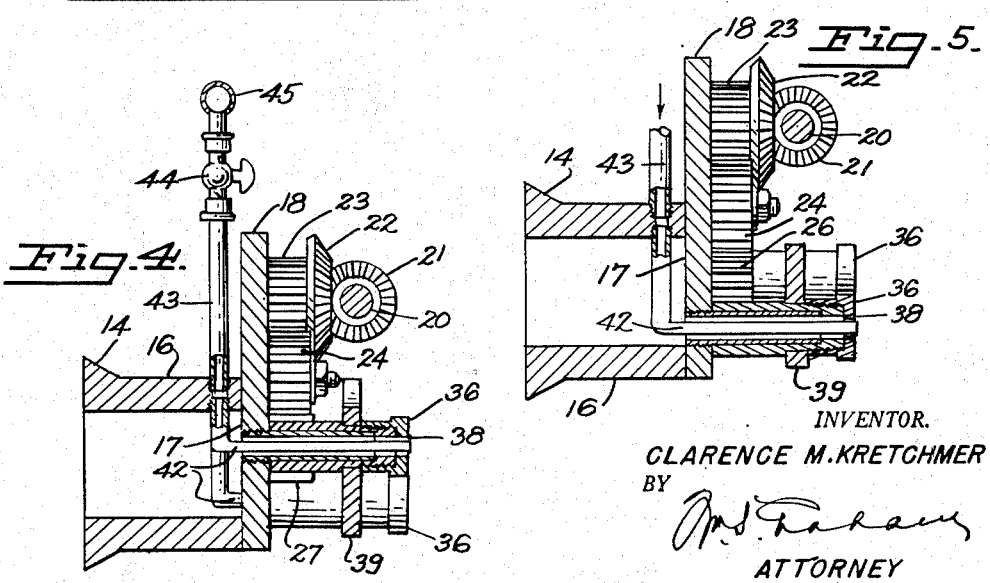
INVENTOR.
CLARENCE M. KRETCHMER
BY
ATTORNEY Feb. 1, 1955
C. M. KRETCHMER
2,700,943
METHOD AND APPARATUS FOR MAKING CANDY BAR STRIPS
Filed Sept. 25, 1952
2 Sheets-Sheet 2
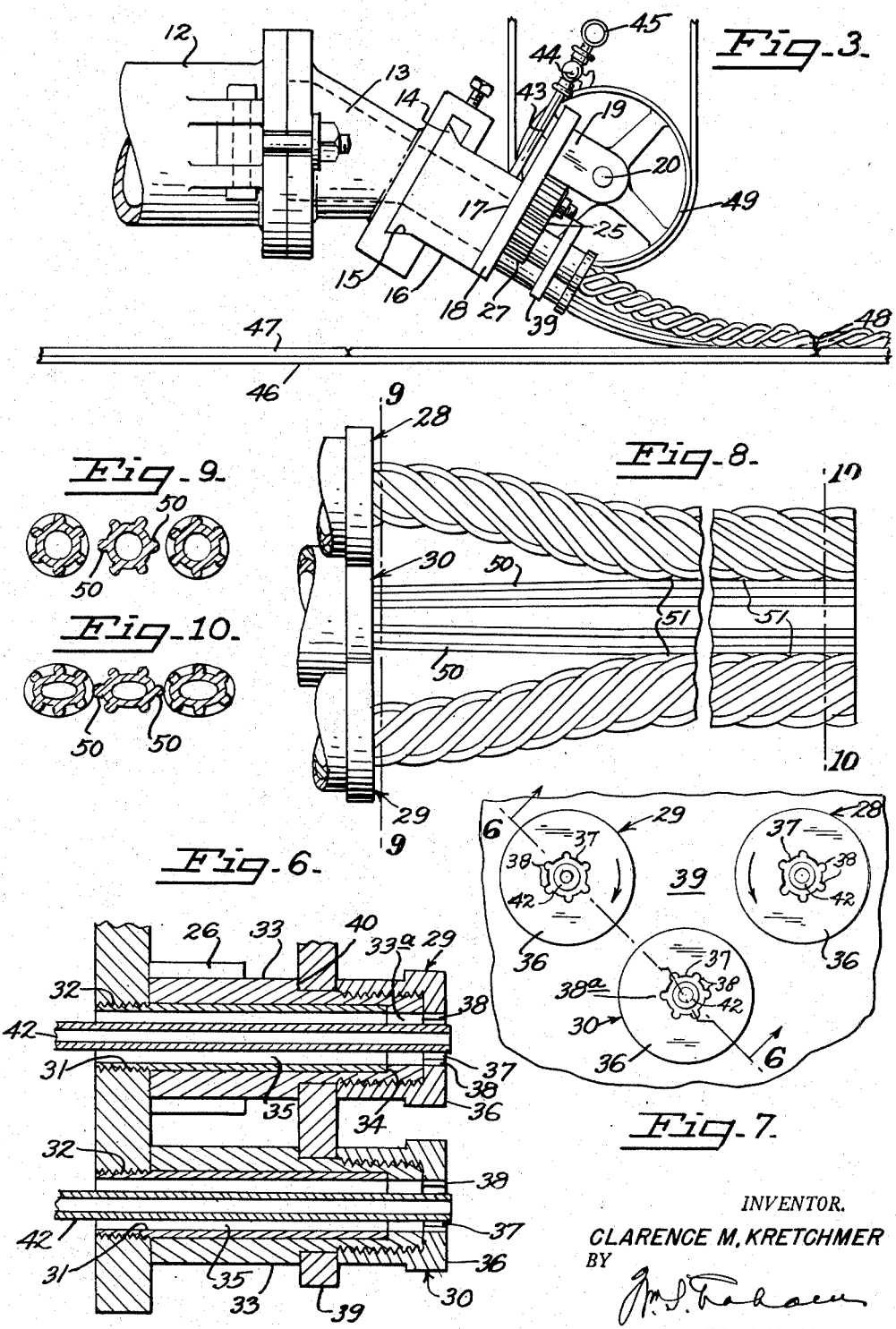
INVENTOR.
CLARENCE M. KRETCHMER
BY
ATTORNEY

United States Patent Office 2,700,943
Patented Feb. 1, 1955

2,700,943

METHOD AND APPARATUS FOR MAKING CANDY BAR STRIPS

Clarence M. Kretchmer, Belvedere, Calif.

Application September 25, 1952, Serial No. 311,495

11 Claims. (Cl. 107—14)

This invention relates to apparatus and method for making candy bars and more particularly relates to such apparatus and method for forming candy bars in a strip or ribbon by extrusion of a plurality of elongated strings extruded in such manner that the several strings are adhesively connected in superficial contact at longitudinal edges whereby they adhere relatively by viscosity as they are extruded and conveyed from the apparatus.

It is preferred that the apparatus and the method be adapted to form the several strings in tubular form, though, if desired they may be made solid throughout their body.

Briefly described, the invention includes means for effectuating the method of feeding under pressure an agglutinate mass of plastic candy material, forming it and conveying it in parallel strings in such proximity that the strings adhere due to the plasticity thereof, the means consisting of a plurality of relatively spaced forming dies having matrices for extruding the material to provide a plurality of elongated relatively narrow strings. These dies are preferably at the free ends of forming barrels or cylinders which initially form the several strings and extrude them through the dies upon an underlying conveyor in substantially parallel relation, the dies being adjacently spaced and positioned in such proximity that the extruded plastic strings when deposited on the conveyor may superficially contact at opposed longitudinal edges and adhere due to their viscosity. Preferably the dies are provided with a plurality of scallops around the periphery of their respective matrix openings to provide longitudinal ribs on the strings, and preferably at least one of the dies is rotatable simultaneously with extruding the material, the string of plastic material extruded from the rotated die being thus ribbed helically, whereby the helical ribs contact and adhere to the next adjoining string at longitudinally spaced points and thus provide spaces between points of contact of the nature of perforations so that the strings may be readily manually separated for eating as separate strings, if so desired.

It is also preferred that the matrix or forming opening of the extruding dies be open centrally so that an air tube may be mounted at the axis of the die in spaced relation to the circumference of the opening and about which the viscous candy material is tubularly extruded simultaneously with ejecting a stream of pressure air in the center of the strings whereby the strings are inflated as they are extruded.

In the preferred form of the invention exemplified herein, the means and method of the invention provide for counter rotation of a pair of spaced dies, one clockwise and the other counter-clockwise and a center die therebetween which is fixed; the matrices of the dies having peripheral scallops for forming ribs on the strings as they are extruded, the fixed die extruding the material between the spaced rotated dies, whereby the two counter-rotated dies on opposite sides thereof torque the rotated extruded material towards the string extruded by the fixed die so that when the substantially parallel strings flatten, the helical ribs of the strings from the rotated dies superficially contact the opposite edges of the longitudinally aligned ribs of the center string simultaneously with the conveying thereof and thereby adhere to the aligned ribs at spaced points on the opposite edges thereof.

It is to be understood that the invention contemplates a method and apparatus for making several types of ribbed candy bars, such as a plurality of strings having longitudinally aligned ribs, a helically ribbed string between a pair of plain tubular unribbed strings, a helically ribbed string between a pair of strings which have parallely aligned ribs, a plurality of helically ribbed strings, or as exemplified herein, a pair of helically ribbed strings with a string therebetween having longitudinally aligned ribs. The term "string" is employed to indicate the several separate extruded lengths of candy material as extinguished from a strip or ribbon consisting of a plurality of such strings relatively connected.

One form in which the invention may be exemplified is described herein and illustrated in the accompanying drawings in which:

Fig. 1 is a front elevation of the device of the invention.

Fig. 2 is a fragmentary front elevation of gear plate of Fig. 1 with a die-supporting plate removed.

Fig. 3 is a side elevation of Fig. 1.

Fig. 4 is a lateral transverse vertical section on line 4—4 of Fig. 1.

Fig. 5 is a fragmentary lateral transverse vertical section on line 5—5 of Fig. 1.

Fig. 6 is a fragmentary section on line 6—6 of Fig. 7, enlarged with relation to Fig. 1.

Fig. 7 is a fragmentary front elevation of tubular extruding cylinder members in Fig. 8, the extruded material being removed.

Fig. 8 is a fragmentary plan view of extruding cylinder members, enlarged with relation to Fig. 1.

Fig. 9 is a vertical transverse section through individual strings of candy material as they are extruded from dies, as shown on line 9—9 of Fig. 8, but spaced more closely together to condense them on the sheet.

Fig. 10 is a vertical transverse section on line 10—10 of Fig. 8.

Referring to the drawings in which like reference characters indicate corresponding parts in the several views, there is provided any suitable container or vat (not shown) which holds a supply of plastic mix which may flow therefrom by any suitable pressure through a feed conduit 12 and through a hollow spreader nozzle 13 which flares into a substantially rectangular elongated open discharge end. At the discharge end of the spreader nozzle 13 is mounted an elongated key slot member 15 into which is slidable a splined end of an elongated box member 16, the opposite end of the box being connected as at 17 to a gear panel 18 at an elongated substantially rectangular connecting opening 14 having dimensions of sufficient length and height to include within the plane of its opening certain passageways for air and plastic candy material which will be described.

The gear panel 18 rotatively mounts driving gears, extruding cylinders and air pressure tubes, as best shown in Figs. 1 to 4. The gear panel mounts adjacent its opposite ends upstanding bracket members 19 which support rotated shaft 20 which has at each end portion a miter pinion gear 21 meshing with complementally bevelled reduction gears 22 each of which has a spur gear 23 mounted rearwardly thereof for unison rotation therewith.

Since the devices shown in Figs. 1 and 2 illustrate three similar operative die units separated by the lines A—A and B—B it will be necessary only to described one unit, the other units having similar mechanism and operating in like manner both as an apparatus and in performance of the method.

Referring to Fig. 2 it will be noted that each of the spur gears 23 drives a gear train in which a pair of successive driven gears 24 and 25 are rotated oppositely by spur gear 23, one clockwise and the other counter-clockwise, and each gear train driving a main driven gear in the next adjacent or center unit. This mechanical structure may be duplicated in any number of similar operative units.

The driven gears 24 and 25 are thereby rotated oppositely relatively, and each meshes with a nozzle gear on an extruding nozzle, as indicated 26 and 27 which thereby rotate oppositely relatively, the nozzle gears 26 and 27 each being mounted upon a rotatable extrusion nozzle 28, 29. It is to be noted that, however, in the preferred form of the invention there are three extrusion nozzles in each operative unit, as will be described.

The extruding nozzles are also mounted upon the gear panel and are preferably cylindrical. In the preferred form of the one unit now described, there are three such nozzles indicated 28, 29 and 30. The nozzles 28 and 29 are rotated by the gears 26 and 27 mounted thereon, and the nozzle 30 is fixed or stationary. Each extrusion nozzle comprises an elongated tubular supporting core member 31 threadedly mounted securely in the gear panel 18, as at 32. Mounted upon the core 31 is an outer casing cylinder 33 likewise tubular and providing an internal shoulder 34 adjacently spaced from its forward or free end, the shoulder 34 providing an abutment against which the end of the inner core member abuts whereby the tubular bore 35 of the inner core and the outer cylinder is continuous and is conformed to a uniform diameter. The outer cylinder 33 has a rotative bearing fit upon the inner core 31. At the free discharge end of each of the cylinders and rotatable therewith there is threadedly mounted an extrusion diehead cap 36 having a matrix or forming opening 37 generally circular and registering with the tubular bore 35, the die matrix opening having relatively small substantially semi-circular circumferentially spaced scallops 38, six of which are shown as being convenient to provide external ribs upon the extruded plastic candy material. Providing the shoulder 34 in spaced relation to the free end of the cylinder provides a rotative wall portion 33a, so that the candy material will begin to have a rotative twist thereto while still confined within the bore 35; otherwise the rotation of the diehead only might have a tendency to sever the extruded string.

Preferably the extrusion nozzles 28, 29 and 30 are of similar construction so as to be interchangeable, except that, in the present exemplification of the invention, two thereof, namely those indicated 28, 29 are rotatable oppositely relatively by means of gears 26 and 27 mounted thereon, whereas the gear for rotation is eliminated on the nozzle 30 which is fixedly and non-rotatively mounted on the gear panel. At the outer end portions of the extrusion nozzles they are stabilized and supported by a plate 39 through which the outer end of the nozzle extends, the plate serving as a bearing for the rotated nozzles and also to maintain the nozzles in contact with the panel board by means of a shoulder 40. The plate 39 is securely fixed to the gear panel 18 by bolts 41.

As will be described in connection with the operation of the apparatus and method, it is desirable that the strings extruded from the nozzle be tubular and inflated with air. Since at time of extrusion the candy material is relatively soft and plastic, means are provided for providing a tubular or hollow center to the strings. In spaced relation to the wall of the bore 35 of each of the extrusion nozzles there is an axial air tube 42, the strings being tubularly formed by extrusion circumferentially of the air tube. Simultaneously wtih such extrusion a stream of pressure air is delivered through the air tube 42 by the connections 43 and the regulating valves 44 from an air source 45.

In Figs. 1 and 2 the gear panels are shown in front elevation perpendicular to a horizontal plane, but in actual operation the axis of the extrusion nozzles is inclined to a horizontal plane as shown in Fig. 3 whereby the extrusion dies are adjacently above and angularly to a conveyor belt 46 upon which ride removable tray boards 47 on which the extruded strings are deposited by the extrusion nozzles.

In operation a viscous cohesive quite soft and plastic candy mix in the container (not shown) is suitably flowed by gravitational or other suitable pressure through the feed conduit 12 and is spread by the elongated spreader nozzle 13 to the elongated box 16 with which the open feed ends of tubes 35 of the tubular core members 31 communicate, the plastic mix being forced through the tubes 35 which are continuous in the core members 31 and the outer free end of the cylinder members 33. This pressure flow of the candy material is circumferentially of air tube 42, and it is thereupon extruded through the openings 37, 38 of the dieheads. The exterior of the extruded strip will take the form of the matrix opening in the die. Since the strip is extruded circumferentially of the air tube 42, it is manifest that it will be a hollow tubular string as the soft plastic material is extruded. Likewise it is obvious that since these strings are a soft plastic mix, they would sag into a flat ribbon unless its tubular form is preserved, wherefore a stream of low pressure air is forced through the air tube 42 simultaneously with the extrusion. This air stream is provided with resistance by closing the lead or free extruded end of the strings when they are severed into predetermined length at the ends 48 of the trays 47 as the soft plastic strings are deposited on the underlying trays upon the conveyor belt 46, thus maintaining the strings inflated as tubes. As successive strings are deposited on the trays and conveyor and cut to the tray lengths, the strips entrap the air therein and maintain the inflation thereof as tubes for drying and hardening.

Simultaneously, as the plastic material is extruded, the shaft 20 is rotated by pulley 49 which in turn rotates the gears 24, 25 relatively oppositely as indicated by the arrows adjacent thereto in the drawing, and thereby rotates the gears 26, 27 and extruding cylinders 28, 29 oppositely relative to each other, the extruding cylinder 30 remaining fixed or stationary.

It is to be noted that the extruded tubular strings will have external longitudinal ribs because of the matrix scallops 38, and that because the central cylinder 30 is fixed, the ribs of that string will be longitudinally axially aligned, the matrix scallops 38a being positioned in a horizontal plane so that there will be no one rib along each opposite side of the strings. On the other hand, the strings extruded from the dieheads 36 of rotating cylinders 28 and 29 will have helical ribs in which the incline of the helix is opposite in each of the strips due to the relative counter-rotation of the cylinders 28, 29.

From Figs. 1 and 7 it will be noted that the extrusion cylinders and the dieheads thereof are relatively spaced so that, in a horizontal plane, the two rotating cylinders 28, 29 are parallel and relatively spaced and that the fixed cylinder 30 is spaced substantially midway therebetween, though illustrated as being spaced in a vertical plane at a lower elevation to provide sufficient space for cylinders of the exemplified diameter, as best shown in Fig. 7. The soft plastic material, though extruded from the dieheads in generally circular form in transverse section, tends to flatten to a generally oval form as it is progressively extruded upon the trays of the conveyor belt, even though inflated with air. Also, because of the oppositely rotating dieheads of cylinders 28, 29, there is a tortional twist of the soft plastic extruded material towards the central fixed non-rotated cylinder from which the axially aligned string is extruded. The two oppositely rotated cylinders 28, 29 and their respective dieheads are so spaced and so rotated, and the conveyor is so speeded, that this flattening and torsional twist of the strings extruded by the rotated cylinders positions the helical ribs of the flattened strings in superficial contact with the opposite longitudinal ribs 50 of the axially aligned central string from the fixed cylinder at a point about four inches from the dieheads. Because of the inherent adhesiveness of the relatively soft plastic mix of the strings they adhere at the points of superficial contact of the helical ribs of the outer strings and the axially aligned ribs on the opposite sides of the center string and thus provide, by such adherence, a combined strip having small openings 51 between each point of adhering contact, which openings are in the nature of aligned tear strip perforations along the edge of the abutting ribs whereby the individual strings may be separated for eating as individual strings after the combined connected strips have been dried.

After the extruded strings have been deposited upon the trays 47 on the conveyor and adhere as the combined strips previously described, they are cut into predetermined lengths at the ends 48 of the individual trays, which, because of the soft plastic nature of the formed strips, seals such cut ends and entraps the contained air therein, whereupon the trays are conveyed or otherwise moved to a drying chamber and the relatively connected strips sufficiently dried for convenient manual manipulation of the strips without being unduly sticky. It has been the practice to further cut the dried strips into relatively short lengths of about five inches and wrap them as candy bars.

While the apparatus and method have been described and exemplified herein for making a candy bar comprising a strip consisting of three connected strings, as described, it is to be understood that the invention also contemplates method and apparatus for making a candy bar consisting of a lesser number of connected strings or a greater number of such connected and extruded strings.

Having described the invention, what is claimed as new and patentable is:

1. An apparatus for making strips of candy bars by superficially connecting longitudinal side edges of several strings thereof, comprising a box for receiving a plastic mass of candy material, means for delivering the plastic mass material to said box under pressure, said box having through a wall thereof a plurality of relatively spaced openings, a rotatably mounted forming diehead having communication with each of said openings in the box for extruding a string of said plastic material therethrough, a conveyor underlying the dieheads for receiving the extruded strings thereon, said dieheads being provided with a central matrix opening having radial scallops therearound whereby the plastic strings extruded therefrom have exterior elongated ribs, and means for rotating at least a pair of said dieheads relatively oppositely simultaneously with the extrusion of the plastic material whereby the ribs of the strings extruded from the oppositely rotated dieheads are formed helically with relatively oppositely inclined helices, the dieheads being so positioned and in such proximity that the extruded strings may flow into superficial contact on the conveyor at relatively opposed portions of the ribs and adhere due to the plasticity of the extruded candy material.

2. An apparatus of the character described having the elements of claim 1, and which includes tubular cylinders communicating with the box through said spaced openings, the dieheads being mounted at the free end of the tubular cylinders, and in which the means which rotates the dieheads also rotates said cylinders.

3. An apparatus of the character described having the elements of claim 1 and in which there is an air supply tube centrally of the matrix opening in the dieheads and spaced radially inwardly from the walls of the said matrix openings whereby such plastic material may be extruded from the dieheads circumferentially of the air tubes and filled with air simultaneously with the extrusion thereof.

4. An apparatus for making candy strips of a plurality of strings of candy material, as set forth in claim 1, and in which the oppositely rotated dieheads are relatively spaced in a horizontal plane and there is a diehead therebetween in an adjacently vertically spaced plane and fixed against rotation.

5. An apparatus of the character described having the elements of claim 1, the dieheads being mounted at the free end of tubular cylinders and the means which rotates the dieheads also simultaneously rotates said cylinders, and in which a pair of said oppositely rotated cylinders are relatively spaced in a horizontal plane and there is a cylinder therebetween in an adjacently vertically spaced plane and fixed against rotation.

6. An apparatus for making strips of candy bars by superficially connecting longitudinal side edges of several strings thereof, said apparatus having the elements of claim 1 and in which a pair of the counter-rotatable dieheads are relatively spaced in a horizontal plane and there is a diehead therebetween in an adjacently vertically spaced plane and fixed against rotation, and an air supply tube centrally of the matrix opening of the dieheads and spaced from the wall of the central portion of said matrix opening whereby said plastic material may be extruded from the dieheads circumferentially of the air tube simultaneously with the opposite relative rotation of the counter-rotated dieheads.

7. A method of making candy bars in strips of a plurality of radially separable longitudinally connected strings, comprising the steps of feeding a plastic mass of candy material and forming it into a plurality of separate longitudinally ribbed adjacently spaced strings, and axially rotating at least a portion of the several ribbed strings simultaneously with the forming thereof whereby the ribs are disposed helically upon the rotated strings, and depositing and conveying said helically ribbed strings in adjacently spaced substantial parallelism at opposite longitudinal sides of a central string therebetween whereby the helical ribs of the helically ribbed strings come into superficial adhering contact with the central string upon spreading of the plastic strings responsive to the plasticity thereof, such adhering contact being at spaced points providing a perforated tearstrip relation between the helically ribbed strings and the central string therebetween.

8. A method of the character described having the steps of claim 7 and in which the separate strings are formed hollow and inflated with air simultaneously with the forming of them into strings from the plastic mass.

9. A method of the character described having the steps of claim 7 and including the step of forming the central string with axially aligned ribs, and depositing and conveying all of said strings in substantial relatively parallelism in plastic consistency and in such relative spacing whereby the helical ribs of the helically ribbed strings superficially and adhesively flow into contact with the opposite sides of the axially aligned ribs of the central string responsive to the plasticity of the several strings.

10. In an apparatus for making strips of candy bars, said apparatus having a means for feeding a plastic candy mix and a traveling conveyor belt for receiving and conveying strips of formed agglutinate plastic candy mix deposited thereupon, the combination therewith of a plurality of die heads mounted overlying the conveyor belt, certain of said die heads being rotatably mounted, means for rotating the rotatable dieheads, each die head having communication with the feed means and being provided with a forming matrix for tubularly extruding therethrough of a string of the plastic candy mix, the matrix of the rotatable die heads having circumferential scallops therearound whereby the strings extruded therefrom are helically ribbed and strings having axially aligned ribs are extruded from the remaining dieheads, and means for inflating the tubular strings simultaneously with the extrusion thereof, the die heads being relatively adjacently spaced and positioned in such proximity that the extruded plastic strings are deposited on the conveyor belt in relative parallelism and sufficiently adjacent so that ribs of the strings having helical ribs may superficially contact adjacent parallel strings at spaced longitudinal points of the radially outer portion of the helices along the opposed longitudinal edges of the strings whereby the strings may adhere at said spaced points of contact responsive to the plasticity of the candy mix.

11. A method of making candy bars in strips of a plurality of individual longitudinally connected strings, comprising the steps of feeding an agglutinant plastic mass of candy material and extruding it tubularly in separate longitudinally ribbed adjacently spaced strings, simultaneously axially rotating certain of said spaced strings to arrange the ribs helically thereon while maintaining the ribs aligned longitudinally of a string therebetween, inflating said strings with air while extruding them, depositing and conveying said strings in adjacently spaced substantial parallelism whereby the ribs of the several strings come into superficial adhering contact and provide a connected strip of the strings upon spreading of the plastic strings responsive to the plasticity thereof while being so conveyed, and severing the strips into predetermined lengths on the conveyor while closing the severed ends thereof to hold the air in the strings while they are plastic.

References Cited in the file of this patent

UNITED STATES PATENTS

| Number | Name | Date |
|---|---|---|
| 559,323 | Drake | Apr. 28, 1896 |
| 1,518,587 | Laskey | Dec. 8, 1924 |
| 1,566,705 | Tanzi | Dec. 22, 1925 |
| 2,171,095 | Orsini | Aug. 29, 1939 |
| 2,199,825 | Kretchmer | May 7, 1940 |